July 11, 1939.  T. J. KILLIAN  2,165,709
PRESSURE CONTROL DEVICE FOR LUMINOUS TUBES
Filed March 16, 1938  3 Sheets-Sheet 2

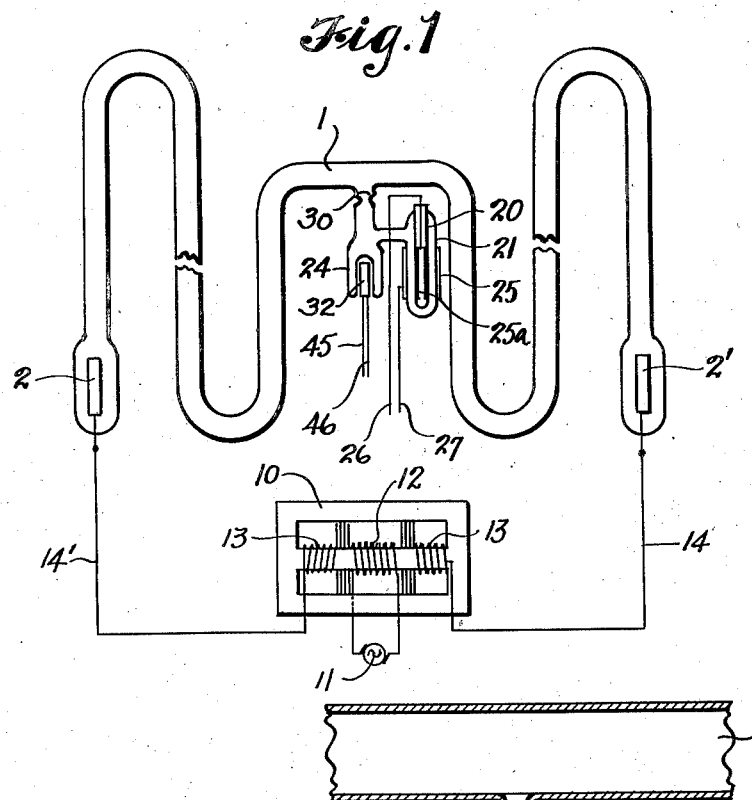
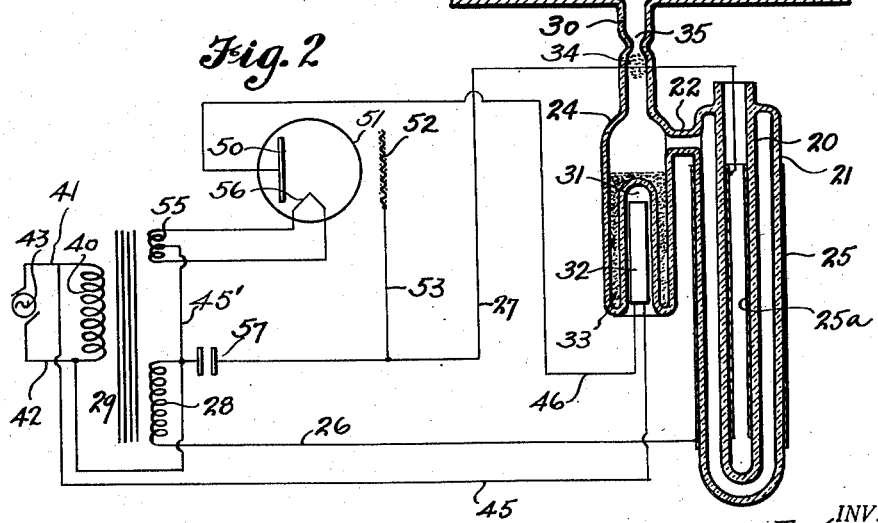

INVENTOR
THOMAS J. KILLIAN
BY
Gifford, Scull & Burgess
ATTORNEYS

July 11, 1939.  T. J. KILLIAN  2,165,709
PRESSURE CONTROL DEVICE FOR LUMINOUS TUBES
Filed March 16, 1938  3 Sheets-Sheet 3
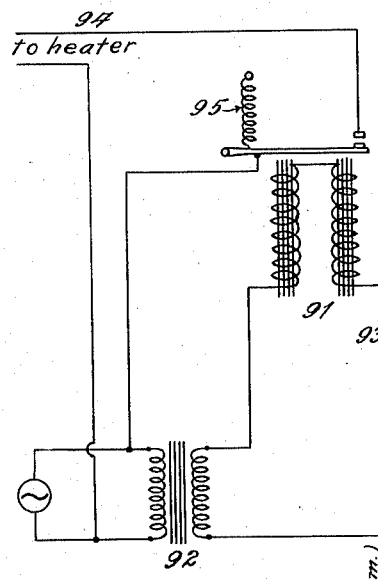
Fig. 9.
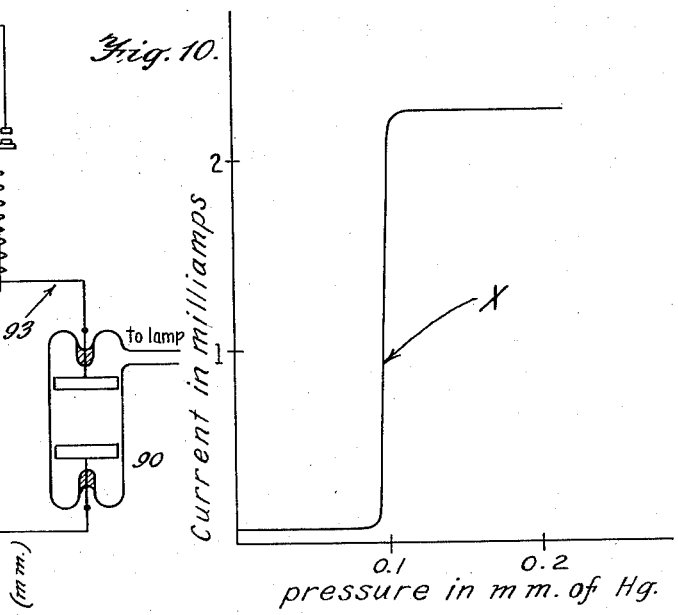
Fig. 10.
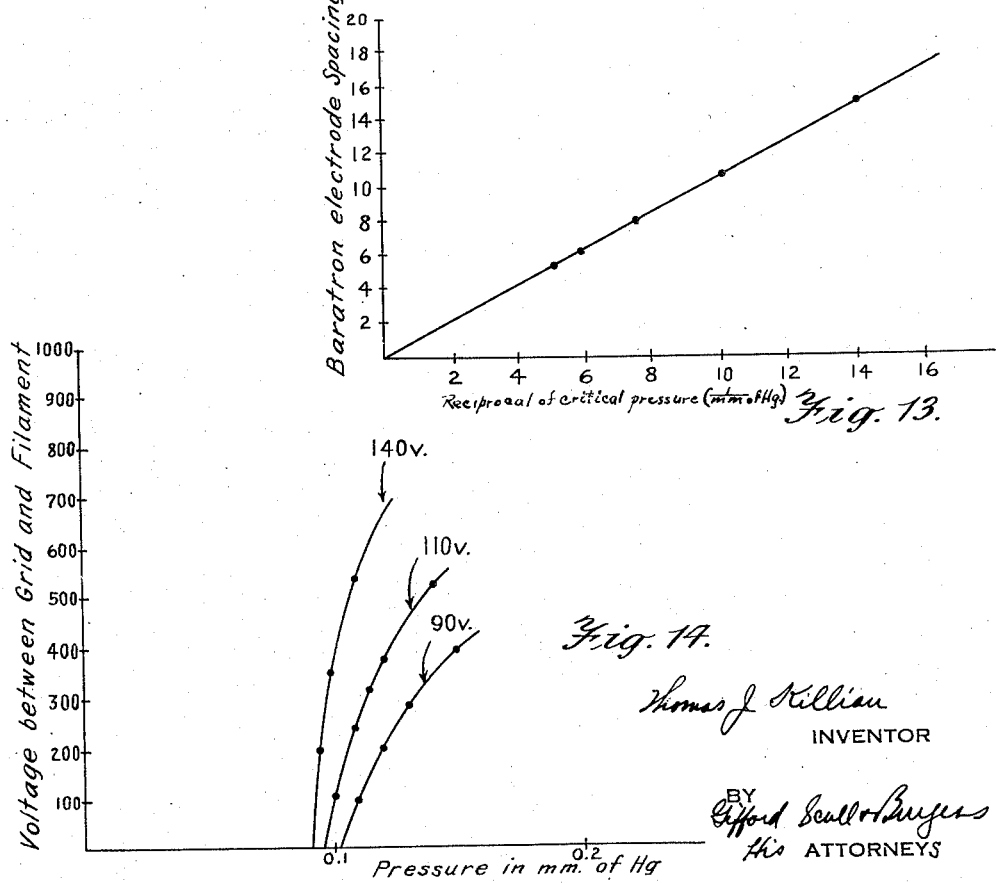
Fig. 13.
Fig. 14.
Thomas J. Killian
INVENTOR
BY
Gifford Scull & Burgess
his ATTORNEYS Patented July 11, 1939

2,165,709

UNITED STATES PATENT OFFICE 2,165,709

PRESSURE CONTROL DEVICE FOR LUMINOUS TUBES

Thomas J. Killian, Seattle, Wash., assignor to Barkon Tube Lighting Corporation, Seattle, Wash., a corporation of Washington Application March 16, 1938, Serial No. 196,289

4 Claims. (Cl. 176—125)

This application is a continuation in part of my application Serial No. 46,718, filed October 25, 1935.

This invention relates to gas filled tubes, ionic discharge tubes and devices of similar character, and particularly to an improved means for regulating the density of the gas within such tubes or other devices in such a way as to control the operation and efficiency of such devices. The arrangement herein disclosed has special application to tubes and other devices operating with carbon dioxide gas or other similar gases.

It is well known in this art that the characteristics of gas filled tubes, such as luminous tubes and gaseous discharge tubes of various sorts, are primarily dependent upon the nature and density of the gases employed in them. Furthermore, it is known, from the results of tests conducted in connection with gaseous discharge devices, that there is a "clean up" of the confined gas of the device during its use. In the case of gaseous discharge lamps, if this lost gas is not replenished there will result a decrease in efficiency, a change in the spectral distribution of the emitted light, and, finally, a failure of the light itself.

Therefore, it is necessary, in order to maintain a constant high efficiency of operation, that provision be made for replenishing the gas in gaseous discharge devices in accordance with its rate of "clean up".

This invention relates not only to ionic discharge devices in general, but also to any gas-filled device in which it is desired to maintain or record changes of gas density.

One of the objects of the present invention is to provide means adapted for use in connection with devices of this general classification that will be sensitive to changes of gas density within a desired range, and which will operate in accordance with changes of the density of the gas in such a device, thus keeping the density practically unchanged and thereby maintaining the device at a constant mode of operation.

In carrying out the present invention a container is provided in direct communication with a luminous lamp tube or other ionic discharge device. A substance from which gas will be supplied when heated is placed in the container or in the ionic discharge device itself. A heater is connected in the circuit of a regulator system whereby current is supplied in inverse relation to the density of the gas in the tube or other device. By the application of heat, the charge of gas in the device is replenished when the gas density falls below a predetermined amount, and the heating decreased or stopped when the desired density of the gas has been reached.

In accomplishing these and other objects of the invention I have provided improved mechanisms the preferred forms of which are illustrated in the accompanying drawings, wherein:

Fig. 1 is a diagrammatic illustration of a luminous or ionic discharge tube or lamp of one type with which the present invention may be used, and illustrating also the recharging means, its control system and the necessary circuit connections therefor and for the lamp;

Fig. 2 is an enlarged, sectional detail of the gas-charging means and regulator system and showing diagrammatically the circuit control devices associated therewith;

Fig. 9 is a diagrammatic illustration of electromagnetic means which may be used instead of the electronic tube 51;

Fig. 10 shows a pressure-current characteristic curve of the baratron;

Fig. 13 is a curve illustrating the linear relationship between the reciprocal of the critical pressure and the spacing between the electrodes of the baratron;

Fig. 14 shows curves illustrating the relationship between the gas pressure and the grid voltage of the electronic tube at various impressed primary voltages.

Figure 3:
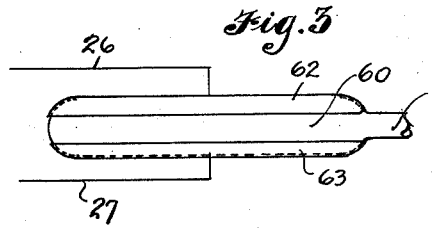
Figs. 3, 3a, 4, 5, 6 and 7 illustrate various modifications of the device, Fig. 3a being an end view of Fig. 3.

Referring more in detail to the drawings:

Reference character 1 indicates the tubular body portion or luminous portion of a gaseous discharge lamp, having terminal electrodes 2 and 2'.

In the illustrative embodiment of the invention shown in the drawings, current for the lamp 1 is supplied through a transformer 10 of the order of 10,000 volts from a source of alternating current 11, connected with the primary winding 12 of the transformer. The secondary winding 13 of the transformer is connected by means of wires 14—14' to the electrodes 2—2'.

Carbon dioxide, or carbon monoxide gas is preferably used in the lamp when it is desired to match clear north sky light. However, modifications of the light may be obtained by filling the tube with a mixture of helium and carbon dioxide or of other gases.

In order to simplify the following descriptive matter and for more convenient reference, the parts designated in Figs. 1 and 2 by numerals 20, 21, 25 and 25a and the devices illustrated in Figs. 3, 4, 5, 6 and 7 will be referred to as a "baratron".

In order that a desired gas density may be automatically maintained, regardless of the "clean up" from tube 1, incident to its use, I have provided means by which this can be accomplished. Such means will now be described.

In Fig. 2, reference characters 20 and 21, respectively, designate two coaxially disposed tubular vessels or cylinders. The outside cylinder 21 is sealed to outside air, but has a connection, as at 22, leading into the upper end of a retort 24, which also is sealed to outside air, but, in turn, has a connection 30 at the top that opens into the tube 1, so that gas pressure within the tube 1 is at all times communicated through the retort connections 30 and 22 to the interior of the tube 21.

The outside of cylinder 21 and the inside of cylinder 20 are coated with electrically conductive material designated by 25 and 25a, respectively, and these electrode coatings are electrically connected, respectively, by wires 26 and 27 in circuit with the secondary 28 of a transformer 29 of the order of 1,200 volts. The word "baratron" as used herein denotes a container having a plurality of electrodes spaced apart in a gaseous medium, said baratron having a current pressure characteristic such that the rate of change of current with gas pressure is very great within a certain narrow pressure range, the mean of said range being the desired critical pressure.

The container 24, as shown in Fig. 2, is a closed cylindrical vessel connected by a neck portion 30 with the tube 1 and by means of the neck 22 with the tube 21, as previously stated. In the lower end of the container is a downwardly opening socket 31 containing an electric heating element 32 of, for instance, five hundred ohms resistance, and filling the lower end of the container is a charge of gas producing substance 33, such as cadmium carbonate or other material suitable for this use, which, upon being heated, will generate gas for replacing that lost from the tube 1 by "clean up". The gas, when generated, passes into tube 1 through a filter 34 of finely divided material, such as glass wool, which allows the gas to flow freely into the lamp but prevents the passage of an electrical discharge between the pressure regulator device and the electrodes 2 and 2'. The filter 34 is located adjacent a constricted passage 35 in the neck 30 which connects the retort with the tube 1.

Instead of using a heater and a gas producing substance, as described above, gas may be obtained from other sources to be introduced into tube 1 to maintain the density or gas pressure at the proper point. For example, gas may be held under pressure in a container connected to tube 1 and a valve provided for admitting such gas to the tube, said valve being operated by variations in current through the baratron. In fact, any one of a large number of arrangements may be used where the change of current through the baratron would cause gas to enter the tube 1 in amounts sufficient to increase the pressure therein up to the desired point. Also, the substance 33 to be heated is not necessarily a substance in which the gas is chemically bound, as activated carbon containing adsorbed gas may be used.

The primary 40 of the transformer 29 is connected in circuit by connectors 41 and 42 with a source of alternating current designated at 43. This may be the same as source 11. In starting the lamp in operation the pressure therein and that in the baratron are usually very low. Alternating current voltage is impressed through the secondary 28 and the capacitor 57 on the electrodes 25—25a of the baratron. Only a small current will flow in this circuit when the pressure between electrodes 25 and 25a is extremely low. This small current through the baratron produces a small voltage drop across the other capacitor 57 and, therefore, a small potential on the control grid 52 of the power tube 51. This small potential on the grid allows a current to flow through the heater 32, to increase the gas pressure in the baratron and the tube. In going from a low to a higher pressure in the baratron, the current therethrough increases suddenly at a certain critical pressure, which is dependent upon the gas used and the geometry of the baratron. This increase in current at the critical pressure causes the voltage across capacitor 57 to increase, thus increasing the grid potential and reducing or stopping current flow through the plate circuit and the heater, as will now be explained.

The heating element 32 is electrically connected in circuit with the primary 40, by wire 45, leading from the heater to the wire 41 and the wire 46 leading from the heater to the plate 50 of a grid controlled electronic power tube 51, thence to filament 56 and wire 45' connected to the mid-point of the secondary 55 to the wire 42. A control grid 52 preferably outside of the tube 51 is connected by wire 53 to wire 27. The low voltage winding 55 of the transformer 29 is connected to the filament 56 of the tube 51. I have found, for example, that a mercury rectifier tube of the 866 type, having added thereto a grid obtained by coating a conductive material as described in my co-pending application Serial No. 43,781, filed October 5, 1935 around the bulge of the tube bulb, may be used as the tube 51. I have also found that a magnetically operated relay may be used instead of the electronic device. This will be described hereinafter.

With the arrangements as above described, the starting and operations of the tube are as follows:

At very low pressures in the tube 1 and the baratron, the current in the circuit from the transformer winding 28 wil be equal to the voltage across the winding divided by the total impedance of the external circuit. This impedance consists of the capacity of the condenser 57, which may be fixed or variable, the capacity of the system between the filament of the electronic power tube 51 and the control grid 52 and the impedance of the baratron, the first two capacities being in parallel with each other and in series with the impedance of the baratron. The voltage drop across the baratron at very low gas density is the vector sum of three voltage drops, viz., that between the coating 25 and the inside of the glass, that between the inside of the outer tube 21 and the outside of the inner tube 20, and that between the inside of the inner tube 20 and the coating 25a. At gas density below normal in tube 1 and in the baratron, the current through the baratron is small and the voltage drop across condenser 57 and, therefore, the grid voltage, is correspondingly small; in fact, not enough to prevent current from passing through the plate circuit of power tube 51 and the heater 32. The current through the plate circuit of the tube 51 energizes the heater 32 and causes the supply of the desired gas which passes into tube 1 and causes an increase of the pressure or density of the gas in tube 1.

As the gas density in the system and hence in the baratron increases, ionization occurs in the space between the inner and outer tubes of the baratron. This reduces the impedance of the circuit from the secondary 28 of the transformer and the current, therefore, increases, so that the voltage drop across the condenser 57 is increased, thus increasing the potential of the control grid 52 which stops the current flow through the plate circuit of the power tube 51, preventing a further increase of gas pressure in the system as the heating current in the heater 32 is reduced or cut off. Further use of the tube 1 causes the density of the gas in the baratron to decrease due to "clean up". Ionization is thereby reduced in the baratron and the current through it decreases. This causes the voltage drop across the condenser 57 to decrease and permit current to pass through the plate circuit of power tube 51 so that the heating current again flows through the heater 32 until the gas pressure in the tube 1 is brought back to normal.

An example of a luminous tube, together with the normal operating conditions thereof, is given merely for the purpose of illustrating the relation of the various parts herein described.

A tube 12 feet long and 1 inch in diameter is provided with electrodes of the type shown in my co-pending application Serial No. 93,568, filed July 31, 1936 and filled with carbon dioxide gas having a pressure of 0.1 mm. of mercury and has applied to the electrodes a voltage of 5000 from a transformer of high reactance of the conventional luminous tube type, and a current of 300 milliamperes is passed through the tube. Under the conditions above specified the tube will operate at a maximum luminous efficiency until such time as there is a slight decrease in the gas pressure due to normal "clean up". Upon this decrease in pressure the baratron operates as above described, whereupon the gas pressure is re-established to normal and this cyclic operation continues indefinitely.

In the normal operation of the tube, the variation of gas pressure is so slight that although the baratron may be in and out of operation many times, there is no noticeable variation in the quantity and quality of the light. In other words, the baratron is so sensitive as to maintain substantially constant gas pressure in the tube.

Figure 3A:
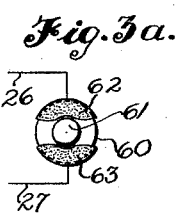

There are various possible modifications of the baratron. For example, in Figs. 3 to 7, inclusive, I have illustrated five alternatives, or modifications, that may be used in a manner similar to that which has been described. The device of Figs. 3 and 3a comprises a closed, tubular chamber 60 which may be sealed in connection with the tube 1 by its neck portion 61. It is provided at opposite sides of the length thereof with conductive coatings 62 and 63 which may be electrically connected to the secondary 28 by means of the wires 26 and 27.

Figure 4:
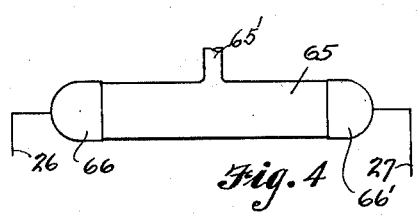

The device of Fig. 4 comprises a closed, tubular chamber 65 to be connected by its neck portion 65' with the tube 1, and having its opposite ends coated as at 66 and 66' with conductive materials and these coatings connected by wires 26 and 27 with the secondary 28. This is particularly suitable for control at extremely low pressures.

Figure 5:
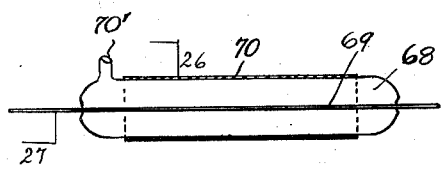

The device of Fig. 5 comprises a tubular vessel 68 having an axially located wire 69 and an external, conductive coating 70. The coating and the wire may be connected to the secondary 28 by the wires 26 and 27, and the vessel may be connected by neck portion 70' with the tube 1.

Figure 6:
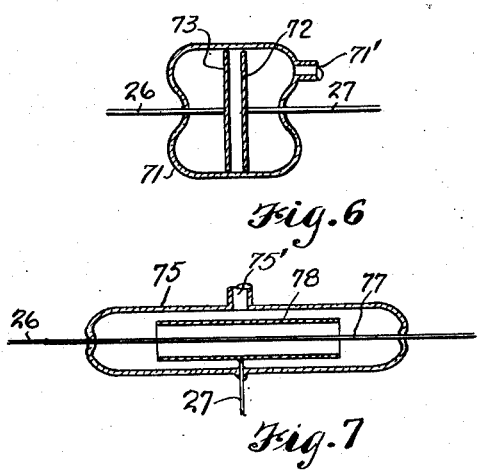

Fig. 6 illustrates a sealed vessel having the wires 26 and 27 entering it from opposite sides and connected with parallel spaced plates 72 and 73 perpendicular to the axis and terminating about their peripheries closely adjacent the walls of the chamber. It may be connected with the tube 1 by neck portion 71'. When the plates 72 and 73 are placed close together the desired critical change of impedance with pressure takes place at higher pressures than in the baratron shown in Figs. 2 to 5.

Figure 7:
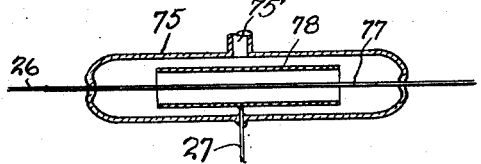

Fig. 7 illustrates a cylindrical vessel 75 to be connected with the tube 1 by neck portion 75'. It has an axially located wire 77 surrounded by a concentric metallic cylinder 78. The wire 77 and the cylinder 78 are to be electrically connected in use, respectively, with the wires 26 and 27.

When baratrons, in which the space conduction path is constant as in the concentric types of Figs. 2, 5 and 7, are used, it is found that the rate of change of impedance with pressure is the greatest when the pressure is such that the conduction path is of the order of the average distance between collisions of electrons with gas molecules. It is found that the critical-control pressure varies inversely with the length of the space conduction path if the voltage across 28 is fixed. Raising the voltage across 28 keeping the baratron the same causes the critical-control pressure to drop slightly and lowering this voltage causes it to rise slightly. However, for a given gas there is a minimum voltage across 28 below which there is no control.

In Fig. 13, the relationship of the spacing of the baratron electrodes to the reciprocal of the critical pressure is illustrated. It is seen that in actual operation the reciprocal of the critical pressure varies linearly with the distance between the baratron plates. The points on the curve were actually determined during normal operation with baratrons of the type shown in Fig. 6 with carbon dioxide.

In Fig. 14 is illustrated the variation of the voltage across the grid of the control tube with primary voltages of 90, 110, 140. It is seen that increasing the primary voltage causes the baratron to control at only a slightly lower pressure so that the variation of the primary voltage has a small effect upon gas pressure as controlled by the baratron.

Figure 8:
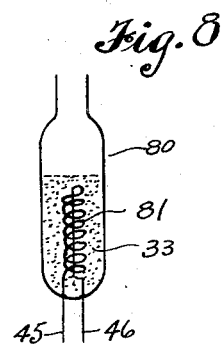
Fig. 8 is an illustration of another arrangement of gas generating and charging means.

It may be desirable in some instances to use a form of container different from that illustrated at 24 in Fig. 2. For example, in Fig. 8, I have shown a container 80 enclosing therein a heating coil 81 which is embedded in the material 33 from which the gas is to be generated.

In Fig. 9 I have shown a diagrammatic circuit for using a magnetically operated relay instead of an electronic power tube, as above explained. A baratron 90 of the type shown in Fig. 6 is connected in series with a relay 91 across the secondary winding of a transformer 92. If the gas is carbon dioxide and it is desired to maintain a pressure of about 0.1 mm. of mercury, the voltage of this winding should be of the order of 1000 volts. The relay 91 should be of the type which when not excited is closed as by a spring 95. The contacts of the relay close a circuit through a heater coil (not shown) or through some other device for replenishing the gas.

At very low pressures the impedance of the baratron is so high that not enough current flows in the circuit 93 to excite the relay 91. Therefore, the contacts are closed by spring 95 and current flows in the heater circuit 94 until the pressure is such that ionization takes place in the baratron 90. This decreases the impedance of the baratron and causes an increase in current in the circuit 93, exciting the relay 91 and opening the circuit 94 to cut off the heater and stop the supply of gas. The tube operates in general the same as with the electronic device.

In the baratron indicated in Fig. 6, the pressure-current characteristic will be as in Fig. 10.

The curve X indicates a very rapid decrease of impedance of the baratron at a critical pressure. The actual impedance values in any case depend upon the relation of the components in the baratron circuit.

Figure 11:
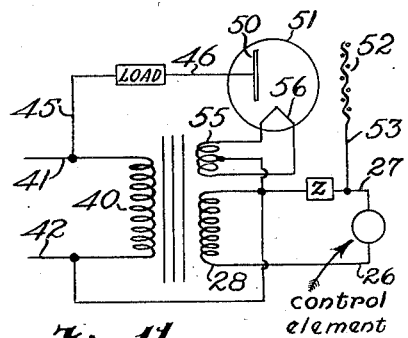
Fig. 11 is a simplified diagram showing the electrical connections.

In the simplified diagram of the electrical connections shown in Fig. 11 parts are designated by the same reference characters as in Fig. 2. However, in this diagram the letter Z in the rectangle is intended to indicate that instead of using a condenser 57, another sort of impedance, either fixed or variable, may be used which may be either a high resistance or an inductance or an impedance which may be made up of capacity, inductance, resistance or two or all of them. Also in this diagram the circle marked "control element" is intended to represent either of the baratrons already described, or a photoelectric cell, or other space conduction devices. Also in this diagram the word "Load" is shown instead of the heater to indicate that other devices than heaters may be electrically operated with this circuit.

Figure 12:
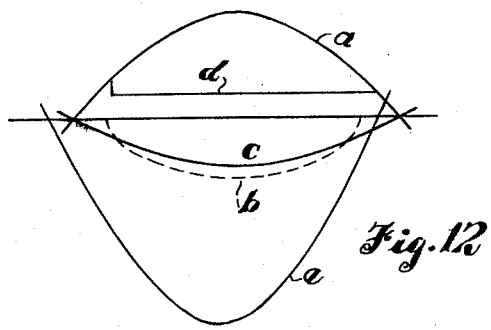
Fig. 12 is a diagram of voltage curves.

Fig. 12 is a diagram showing the relations between plate voltages and grid voltages of a grid controlled vapor tube 51 shown in Fig. 2. In this diagram the curve $a$ represents the plate voltage when no current is flowing between the cathode 56 and the plate 50. Curve $b$ represents the voltage which when applied to the grid 52 will just inhibit the discharge between the cathode 56 and plate 50. Curve $c$ represents the grid voltage when there is no ionization in the baratron, that is, when the current flowing through the grid circuit is small and the drop across the condenser 57 is correspondingly small. At the point where the curve $c$ crosses the critical grid voltage curve $b$ discharge begins between the cathode and the plate, and the plate voltage drops to curve $d$. Curve $e$ represents the grid voltage, which is the voltage drop across the condenser 57, when ionization occurs in the baratron and there is an increase of current in the grid circuit. This voltage drop across the condenser 57 is shifted in phase from the position that it had at zero ionization, and at the same time its amplitude is increased. This voltage $e$ on the grid will prevent any discharge between the cathode and the anode of the grid controlled vapor tube and thus cut off the current from the load, because this voltage $e$ on the grid is at all times greater than the critical grid voltage $b$.

The invention herein described is susceptible of various modifications without departing from the spirit of the invention, and it is the intent that the claims shall not be limited to specific details of construction, but shall be given an interpretation that is commensurate with the scope of the invention disclosed.

I claim:

1. In a device of the character described, a gas filled tube, a source of gas in communication with said tube, and means to regulate the gas density in said tube when luminous, said means comprising a vapor electric device having a cathode, an anode and a control grid and circuits therefor, a device connected in the anode circuit of said vapor electric device for causing gas to pass from said source to said tube when the gas density in said tube decreases, and a baratron communicating with said luminous tube and connected in the control grid circuit of said vapor electric device, current for said anode circuit being supplied from a source of alternating current and current for said grid circuit being supplied from the secondary of a transformer connected to said source.

2. In a device for controlling the gas pressure in a gas filled tube, a source of gas in communication with the inside of said tube, a baratron in communication with said tube, an alternating current circuit comprising said baratron and an impedance, a grid controlled electronic tube, and a heater actuated by current from said electronic tube to cause gas to pass from said source into said gas filled tube.

3. In a device for controlling the gas pressure in a gas filled tube, a source of gas in communication with the inside of said tube, a baratron, an alternating current circuit comprising said baratron and an impedance, a grid controlled electronic tube having its grid connected between said impedance and one electrode of said baratron, and a heater actuated by current from said electronic tube to cause gas to pass from said source into said gas filled tube.

4. In a device for controlling the gas pressure in a gas filled tube, a source of gas in communication with the inside of said tube, a baratron in communication with said tube, an alternating current circuit comprising said baratron and an impedance, a grid controlled electronic tube having its grid connected between said impedance and one electrode of said baratron, and a heater actuated by current from said electronic tube to cause gas to pass from said source into said gas filled tube, the cathode and anode of said electronic tube being connected to a source of alternating current of the same frequency as said first named current.

THOMAS J. KILLIAN.